United States Patent
Tsai et al.

(10) Patent No.: US 7,359,539 B2
(45) Date of Patent: Apr. 15, 2008

(54) METHOD FOR HERNIATED INTER-VERTEBRAL DISC DIAGNOSIS BASED ON IMAGE ANALYSIS OF TRANSVERSE SECTIONS

(75) Inventors: Ming-Dar Tsai, Taipei (TW); Ming-Shium Hsieh, Taipei (TW)

(73) Assignee: Chung Yuan Christian University, Chung Li (TW)

( * ) Notice: Subject to any disclaimer, the term of this patent is extended or adjusted under 35 U.S.C. 154(b) by 707 days.

(21) Appl. No.: 10/458,362

(22) Filed: Jun. 11, 2003

(65) Prior Publication Data

US 2004/0252872 A1    Dec. 16, 2004

(51) Int. Cl.
G06K 9/00    (2006.01)
(52) U.S. Cl. .................. 382/131; 382/128; 382/133; 600/427
(58) Field of Classification Search ........... 382/128, 382/131, 133; 128/922, 898; 600/587, 407, 600/410, 427
See application file for complete search history.

(56) References Cited

U.S. PATENT DOCUMENTS

| | | | | |
|---|---|---|---|---|
| 5,291,537 A | * | 3/1994 | Mazess ................. | 378/54 |
| 5,483,960 A | * | 1/1996 | Steiger et al. ......... | 600/425 |
| 5,533,084 A | * | 7/1996 | Mazess ................. | 378/54 |
| 5,560,360 A | * | 10/1996 | Filler et al. ........... | 600/408 |
| 2006/0085072 A1 | * | 4/2006 | Funk et al. ............ | 623/17.11 |
| 2006/0110017 A1 | * | 5/2006 | Tsai et al. ............. | 382/128 |
| 2007/0036416 A1 | * | 2/2007 | Tsai et al. ............. | 382/128 |

OTHER PUBLICATIONS

Tsai et al,"A new method for lumber herniated inter vertebral disc diagnosis based on image analysis of transverse section",Computerized Medical Imaging and Graphics,V.26,Issue 6, p. 369-380,Dec. 2002.*
Callaghan et al ( Intervertebral disc herniation, Dec. 12, 2000).*
A new method for lumbar herniated inter-vertebral disc diagnosis based on image analysisof transverse section, tsai et al.*
Intraveneous Contrast Enhanced CT of the Postoperative Lumbar spine , Teplick et al.*
A non-destructive technique for 3D microstructural phenotypic characterisation of bones in genetically altered mice, Wolf et al.*

* cited by examiner

*Primary Examiner*—Andrew W. Johns
*Assistant Examiner*—Nancy Bitar
(74) *Attorney, Agent, or Firm*—Harness, Dickey & Pierce, P.L.C.

(57) ABSTRACT

An image analysis method that uses automatic algorithms for the evaluation of herniation classification and geometry in the diagnosis of a herniated inter-vertebral disc (HIVD). Based on a transverse section, the method utilizes a B-spline curve to approximate a circle-like disc boundary and excludes the herniation from other normal parts of the disc boundary. The method therefor attains to feature recognition that classifies the herniation, and the herniation reconstruction that infers the 3D geometry from one or more transverse section. With enhanced resolution provided by the method, a higher diagnostic rate of HIVD is achieved.

15 Claims, 15 Drawing Sheets

FIG. 8(A)
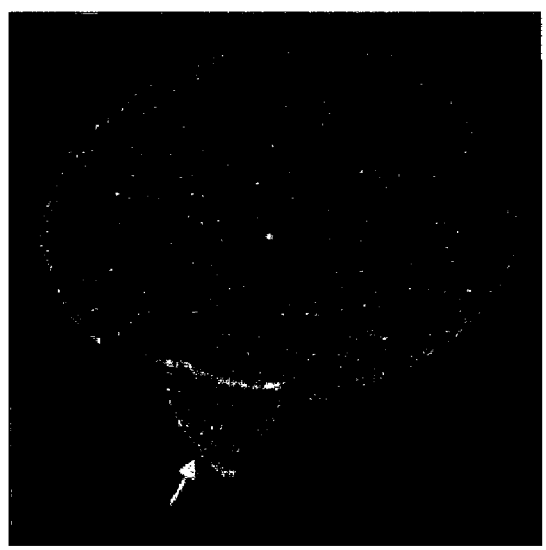
FIG. 8(B)
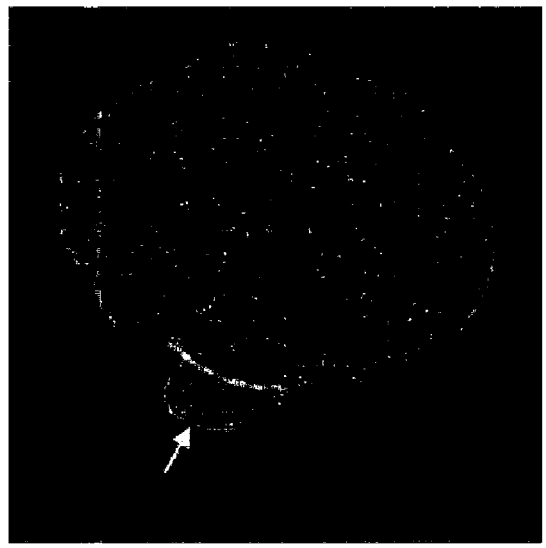
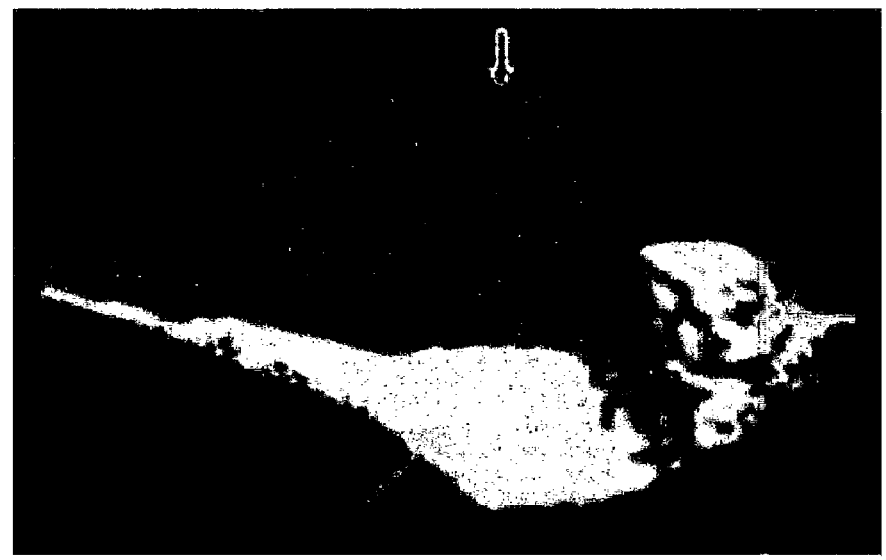
FIG. 8(C)

METHOD FOR HERNIATED INTER-VERTEBRAL DISC DIAGNOSIS BASED ON IMAGE ANALYSIS OF TRANSVERSE SECTIONS

BACKGROUND OF THE INVENTION

1. Field of the Invention

The invention generally relates to an image analysis method, and particularly relates to an analysis method for the evaluation of herniation classification and geometry in the diagnosis of a herniated inter-vertebral disc (HIVD).

2. Related Art

The diagnosis of a lumbar herniated inter-vertebral disc (HIVD) is mainly based on the location at which the herniated disc substances press or break through the ligaments to compress the spinal cord and roots, which results in two categories. First, lumbar HIVD can be classified as central, lateral or both depending on whether the herniated disc substances compress the central spinal cord, one lateral root or both the spinal cord and the two roots. Second, lumbar HIVD can be classified according to the degree to which the disc substances protrude through the ligaments. The first classification, called bulging, is the mildest herniation in which the herniated disc substances do not break through any ligament and the herniated ligaments may therefore touch the spinal cord or roots. In the second classification called protrusion, the disc substances break the inner ligaments so that the herniated ligaments may compress the spinal cord or roots. In the third classification called extrusion, the substances break all except the outermost ligament that only provides low restraint on the substances so that the substances heavily compress the spinal cord or roots. In the most severe classification, called separation (also called free or sequestered disc fragment), the disc substances break all of the ligaments, may extrude past the broken ligaments and may themselves be broken to form a separated structure. Then, the herniated and especially the separated structure can press heavily on the spinal cord or roots. Because the restraints provided by the ligaments impart geometry to the herniated substances, the classification of an HIVD can be judged by analyzing the shape of the herniation.

FIGS. 1(A) and (B) show ideal spatial models in the prior art, illustrating the spatial relations of disc spaces (green areas), vertebral bones (gray areas), and the neighboring spinal cord and roots (red areas). FIG. 1(A) shows the relations between a disc space, the neighboring spinal cord and roots in which the two roots leave from the cord at a position a little above the top border of the disc space. For simplicity, the curved vertebral bones and the spinal cord are represented as having no curvature. The disc-like boundary of disc substances on a transverse section is considered as a circle or an ellipse (because of the elastic restraint of ligaments) and has the highest radius at the middle of the disc space. The spinal root separates from the cord outward and downward (with an angle of about 45-60 degrees). Therefore, we can simply consider that the angular position of the root at every transverse section increases linearly along the direction of gravity. This allows us to calculate an approximately normal angular position (if no herniation) of a root corresponding to the height of the section.

Actually, parts of the boundary of the disc substances on a transverse section may be no longer circle-like because of the appearance of concave or convex features. As FIG. 1 (B) shows, the herniated disc substances form convex features on the boundary, and spurs of the vertebral bone, dural-fat and other substances may obscure disc substances to form concave features on the disc boundary. If the posture of the transverse section is not perpendicular about the spinal axis, the section may cause some bone substances to form concave features at the boundary or an interior bone area of the disc substances. The concave and convex features should be recognized as different from normal parts of the disc, boundary because of their different anatomic meanings. In traditional (boundary representation or constructive solid geometry) solid models, a recognized feature is based on the results of intersection computation between original boundary edges and the lines connecting vertices.

Lumbar HIVD is not accurately diagnosed on the basis of either clinical findings (i.e. patients' history taking and physical examination) or common imaging modalities including X-ray films, computed tomography (CT) and magnetic resonance imaging (MRI). Some imaging techniques that enhance specific anatomic structures can improve the diagnostic rate. For example, discography-enhanced CT (disco-CT) and CT combined with myelography can achieve a higher diagnostic rate than traditional CT (90-72%). However, these enhancing techniques are invasive procedures with higher risk and danger to the human body. The relatively low diagnostic rate on CT or MRI is generally caused by poor resolution on annular ligaments that surround disc substances in the disc space.

The surgical modalities for lumbar HIVD include microdisectomy, percutaneous disectomy (PLD), and traditional disectomy (through partial or total laminectomy). Which modality is used depends not only on the HIVD classification (e.g. microdisectomy can be only applied to the bulging and protruding classifications), but also on the familiarity of surgeons and, more importantly, on the intention and profession of the patient. Because microdisectomy and traditional disectomy are open procedures, accurate shape and position information of the herniation is important for determining from where and how large bone areas should be opened to achieve minimum invasion.

SUMMARY OF THE INVENTION

The object of the invention is to provide a method for analyzing the herniation on an HIVD. The invention overcomes the difficulties of image technologies used in the prior art, which have poor resolution on the shape feature, and the degree and position of the herniation on an HIVD.

The invention provides an image analysis method for a herniated inter-vertebral disc (HIVD), wherein the transverse section is circle-like. First, a transverse section of an inter-vertebral disc space is provided by computed tomography (CT) or magnetic resonance imaging (MRI). Next, a B-spline function is used to approximate a normal boundary so as to determine herniation data of the herniation feature on the transverse section. Substantially, the herniation data includes normal radii, herniation radii, herniation ratios, corresponding integral angular positions, range of integral angular positions, or classification of the herniation feature. Finally, a result output is generated. The result output is shown as an information list of the herniation data, indications on the transverse section or a 3-dimensional image of the herniation feature. Indicating points showing the approximation boundary, and indicating signs (arrows) pointing to the position of the herniation feature, are particularly used in the invention. The 3D image needs more than one transverse section to reconstruct the precise structure of the herniation feature through interpolating procedures.

The image analysis method of the invention is a proper tool of qualitative and quantitative analyses for HIVD diagnosis. Being capable of classifying the herniation and estimating the herniation geometry, the method achieves a higher diagnostic rate of an HIVD. In addition, with enhanced resolution provided by the method, precise surgical procedures for dissection of the herniation can be evaluated.

BRIEF DESCRIPTION OF THE DRAWINGS

The invention will become more fully understood from the detailed description with reference to the accompanying drawing given hereinbelow. However, this description is for purposes of illustration only, and thus is not limitative of the invention, wherein:

FIG. 8(A) is a superior transverse section of analyzed CT for L5-S1 in Embodiment 3 of extrusion HIVD;

FIG. 8(B) is an inferior transverse section of analyzed CT for L5-S1 in Embodiment 3 of extrusion HIVD;

FIG. 8(C) is a 3D image of a reconstructed 3D herniation feature by combining 2D features on the two foregoing sections in Embodiment 3;

DETAILED DESCRIPTION OF THE INVENTION

In the invention, a B-spline curve is used to approximate a normal disc boundary, excluding the concave and convex features. B-spline curves have good approximation for circle, arc, sine or cosine-like boundaries. The invention is therefore applied only to transverse sections of circle-like disc boundaries.

Definitions of terms used in the invention are as follows. A vector from the center to a point on the approximate boundary is called "normal radius". From the point on the approximate boundary along the radius vector, we can obtain one or more points on the original boundary. Then, vectors from the center to the points are called the "herniation radii". The ratio of a herniation radius to a normal radius is called "herniation ratio". There may exist multiple herniation radii and ratios corresponding to the same normal radius in a necking or separation structure at the convex feature. The values and the number of the herniation ratios reveal the HIVD classification represented by the convex feature; the angular positions of the herniation radii reveal the position of the feature. Because only the herniated disc substances compressing the spinal cord and roots should be evaluated, the convex features inside the two spinal roots are considered parts of a herniation feature for diagnosing HIVD.

Sometimes, multiple transverse sections pass the same disc space. They resolve the same 3D herniation because only one herniation occurred in one disc space. However, the 2D herniation features may reveal different HIVD classifications and positions. Herein, we develop algorithms to classify the 3D herniation and its location, and to reconstruct the shape of 3D herniation feature that can combine the geometric characteristics of the 2D features.

Figure 11:
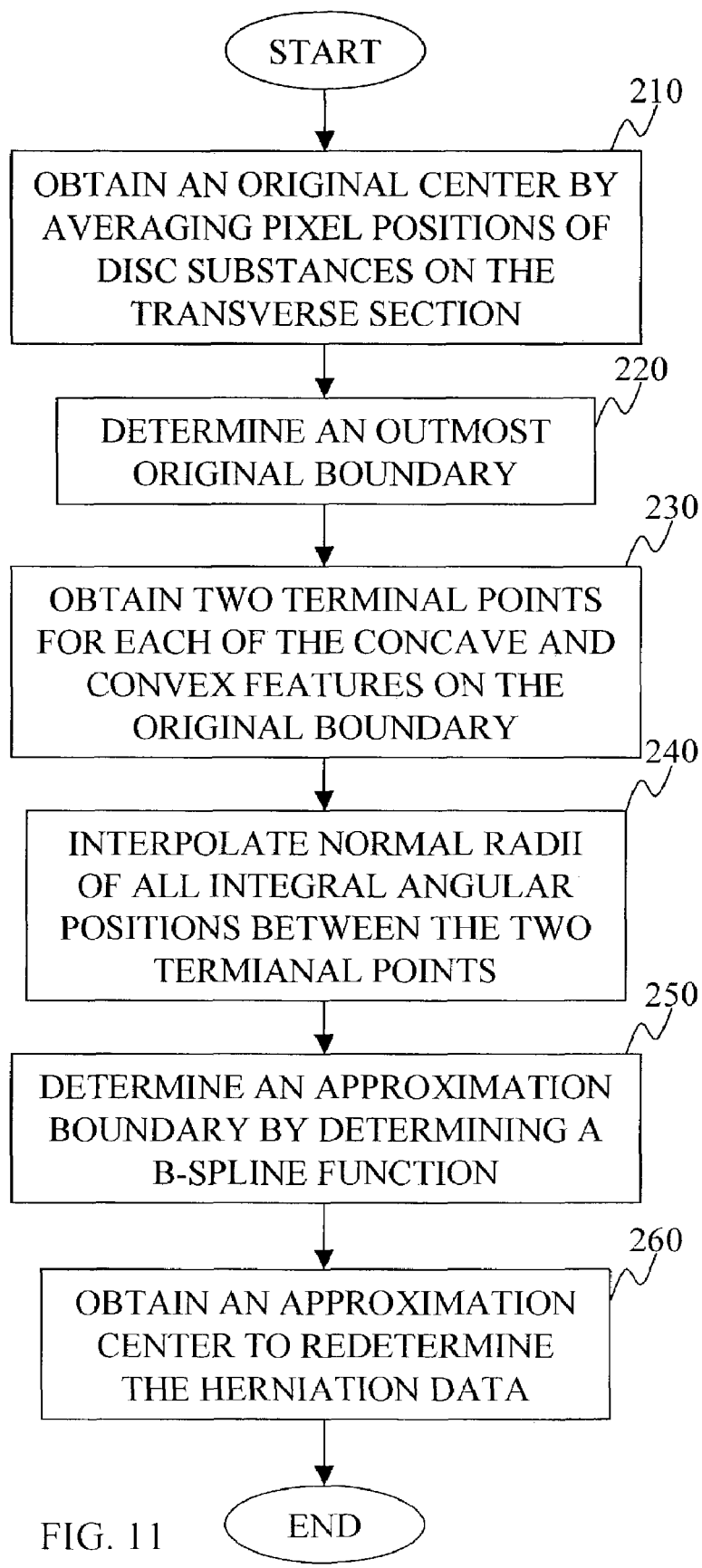
FIG. 11 is a flowchart of determining the herniation data through a B-spline approximation according to the invention.

A process for analyzing transverse sections according to the invention is shown in FIG. 11.

a) Provide a transverse section of an inter-vertebral disc space (step 110). The transverse section is generally provided by computed tomography (CT) or magnetic resonance imaging (MRI).

b) Determine herniation data of a herniation feature on the transverse section by using a B-spline function to approximate a normal boundary thereon (step 120). The herniation data includes normal radii, herniation radii, herniation ratios, corresponding integral angular positions, range of integral angular positions, or classification of the herniation feature.

c) Generate a result output (step 130). The result output is shown as an information list of the herniation data, indications on the transverse section or a 3-dimensional image of the herniation feature. Indicating points showing the approximation boundary, and indicating signs (arrows) pointing to the position of the herniation feature, are particularly useful. However, the 3D image needs more than one transverse section to reconstruct the precise structure of the herniation feature through interpolating procedures.

According to FIGS. 2 and 11 a normal boundary (without herniation) is approximated by a B-spline function that creates an approximation boundary. Herniation data of a herniation feature on the transverse section, including normal radii, herniation radii, herniation ratios, corresponding integral angular positions, range of integral angular positions, or classification of the herniation feature, are all determined during the approximation steps.

(1) Obtain an original center by averaging pixel positions of disc substances on the transverse section (step 210).

(2) Determine an outmost original boundary (step 220). Use a vector starting from the center along every integral angular position to intersect the disc boundary. If multiple intersections are obtained, the outermost intersection is used. Then, the 360 intersections (obtained from 360 integral angular positions) are used to determine the center of the outmost boundary, and the original radii from the original center are also determined. This step can negate the effect of the inner areas inside the boundary of disc substances that are filled with other substances (FIG. 2(A)). When this inner area occurs, a vacuum may appear after disc substances extrude outward to bulge onto or break through the ligaments.

Figure 1A:
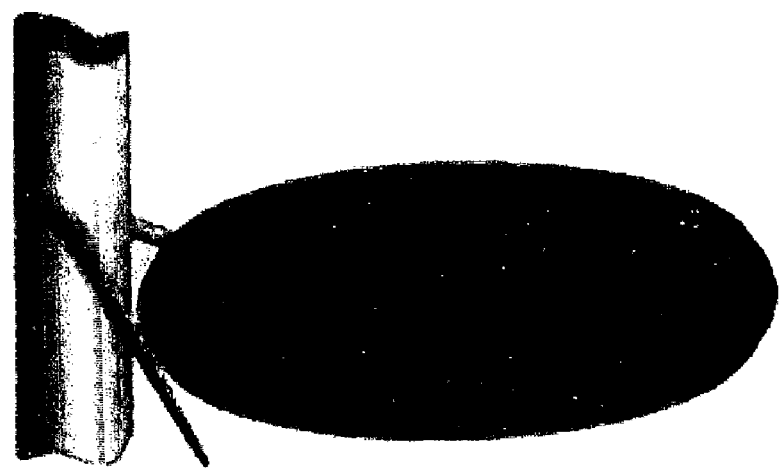
FIG. 1(A) is a 3-dimensional image of an ideal spatial model in the prior art, showing the spatial relation of disc-substances, the spinal cord and roots at a disc space.
Figure 1B:
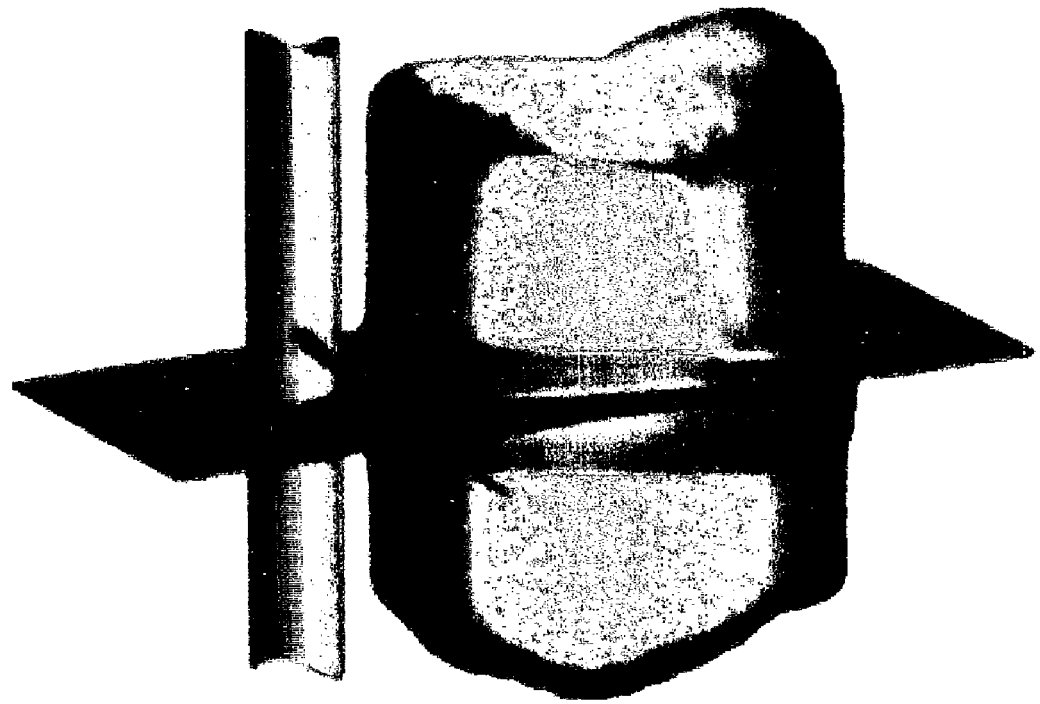
FIG. 1(B) is the 3-dimensional image of another ideal spatial model in the prior art, showing convex features created by herniation of disc substances, and concave features on the disc boundary causing bone spurs obscuring the boundary.
Figure 2A:
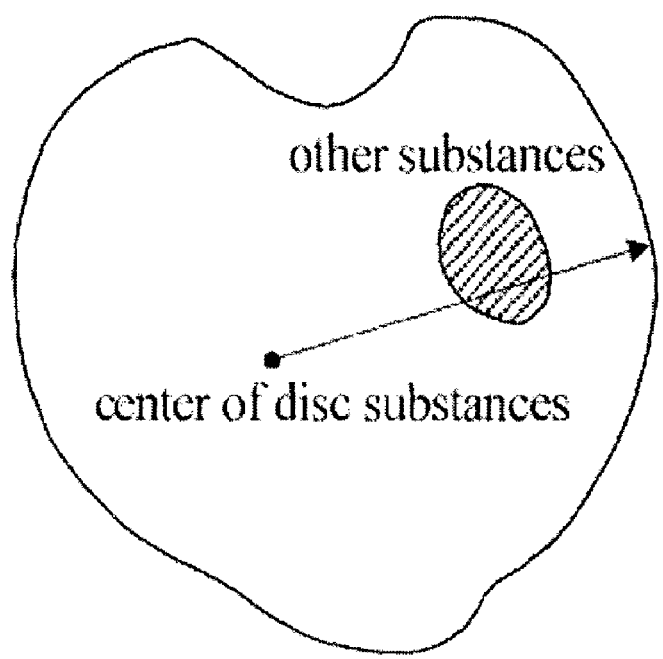
FIGS. 2(A) to (D) are explanatory views of image matching of the disc-substances boundary into a circle-like B-spline approximation associated with concave and convex features.
Figure 2B:
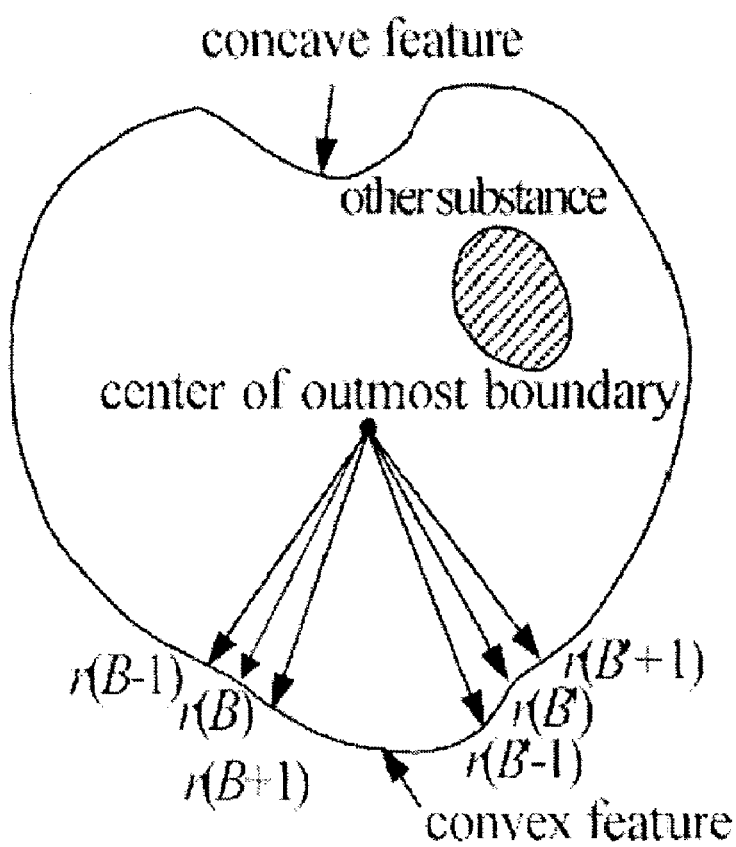
Figure 2C:
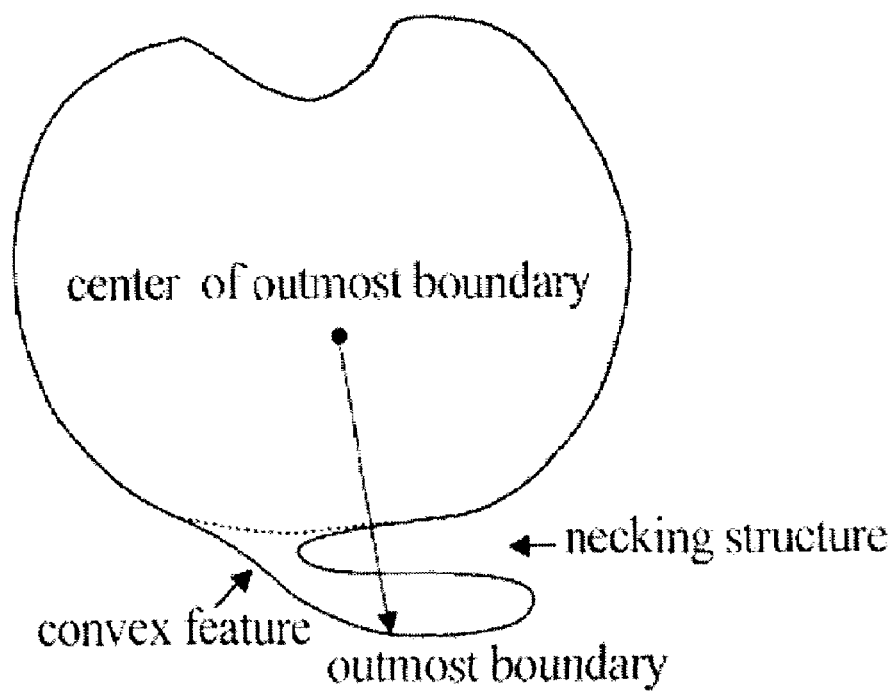
Figure 2D:
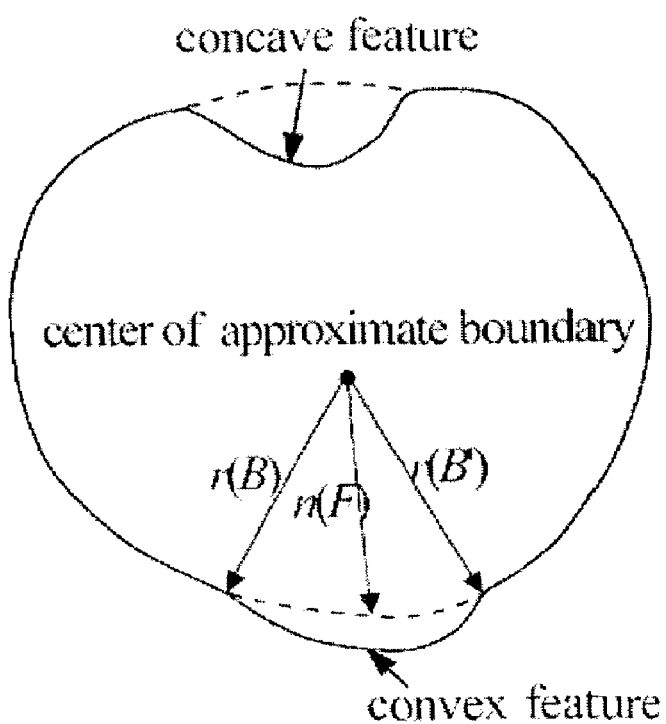

(3) Obtain two terminal points for each of the concave and convex features on the original boundary (step 230). Detect the concave and convex features of the boundary of disc substances so that these features can be excluded during construction of a circle-like approximate boundary by a radial B-spline function (FIG. 2(B)). A convex feature is defined as a part of the disc boundary beginning from the angular position B, in which $(r(B+1)-r(B-1))/r(B)>af.$ af. is a constant. r(B) is the radius (the distance from the center to the boundary) at B. After the radius begins to increase, a convex feature is detected as ending if $(r(B'-1)-r(B'+1))/r(B')>af.$ r(B') is the radius at the angular position B'. Then a convex feature is defined as a boundary between the angular positions B and B'. From B to B' is the (angular) range of the feature. Similarly, a concave feature is defined as a boundary beginning from the angular position B, in which $(r(B+1)-r(B-1))/r(B)<af.,$ and ending at the angular position B', in which $(r(B'-1)-r(B'+1))/r(B')<af.$ From B to B' is the range of the concave feature. During the feature recognition, the radius to the outmost boundary is used. As FIG. 2(C) shows, multiple radii may exist at the same angular position because this convex feature includes a separation or necking structure. Close features are merged as one to consider there are concave or convex changes inside the merged feature, while features of the angular positions between those inside the two spinal roots are parts of the herniation feature of the transverse section.

(4) Interpolate normal radii of all integral angular positions between the two terminal points (step 240). Interpolate the normal radius n(F) of every angular position inside a feature by the radii (r(B) and r(B')) of the two ends of the feature (FIG. 2(D)). For the angular position that is not in any feature, the normal radius is equal to the radius to the outmost boundary.

(5) Determine an approximation boundary by determining a B-spline function (step 250). Determine a cubic B-spline curve with 360 uniform parameters of spacing control points to approximate the normal boundary. Because the B-spline curve passes the normal boundary at every integral angular position, one (the following) linear equation can be obtained at an integral angular position:

$1/6A(F-1)+2/3A(F)+1/6A(F+1)=n(F).$ n(F) is the normal radius at the integral angular position, F. A(F), A(F−1) and A(F+1) are the distances from the center to the control points at the integral angular positions of F, F−1 and F+1. Then, a linear system with 360 equations can be obtained to solve all the 360 control points.

(6) Obtain an approximation center to redetermine the herniation data (step 260). Redetermine the center about the B-spline approximate boundary and then redetermine the radius to the outmost boundary at every integral angular position (original radii), the features (herniation radii), normal radius and then a B-spline function again. In this step, the center is not affected by features but only by the B-spline approximate boundary that is considered the normal boundary of disc substances (if no herniation).

Figure 3A:
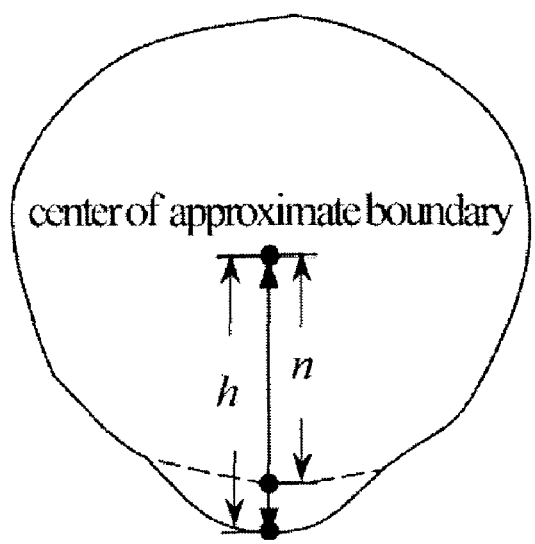
FIG. 3(A) is an explanatory view of feature recognition for determining the classification of HIVD, showing bulging or protrusion features with h as the herniation radius to the original boundary, and n as the radius to the approximate normal boundary.
Figure 3B:
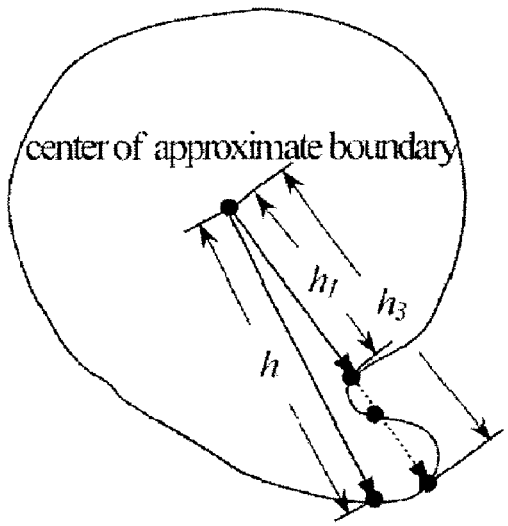
FIG. 3(B) is another explanatory view of feature recognition for determining the classification of HIVD, showing extrusion features having necking structure with h as the herniation radius outside the necking structure, $h_1$ and $h_3$ as herniation radii of angular positions inside the necking structure.

Recognition of the herniation feature for an HIVD classification according to the invention is further described hereinafter. At a herniation feature, the herniation ratios and radii for every angular position are then calculated to classify the HIVD. As shown in FIG. 3, if there are no multiple herniation radii for all angular positions, indicating a lack of necking and separation structures, this 2D feature is classified as the bulging or protrusion (FIG. 3(A)). The largest ratio can be further used to classify which of the features is indicated. However, if the herniation ratio is very large, it can be also classified as an extrusion despite no necking or separation structures on the feature. If some angular positions have multiple (three) herniation radii, this 2D feature is classified as an extrusion or separation (FIGS. 3(B) and (C)). An extrusion feature includes one or two necking structures, in which the herniation radius of the angular position neighboring the angular range with multiple herniation radii is apparently larger than the first ones in the necking structure (FIG. 3(B)).

Figure 3C:
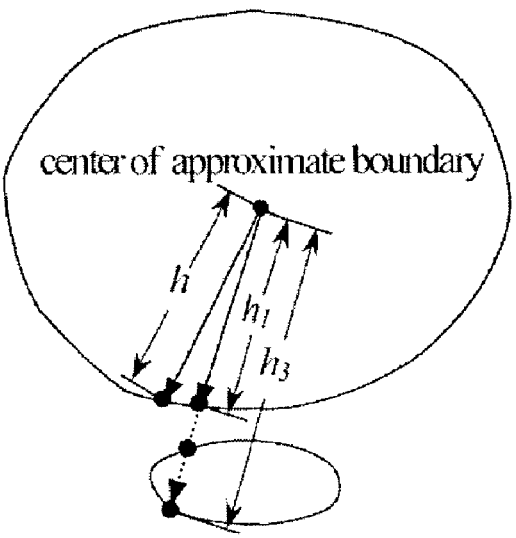
FIG. 3(C) is also an explanatory view of feature recognition for determining the classification of HIVD, showing separation features having a separation structure with h as the herniation radius outside the necking structure, $h_1$ and $h_3$ as herniation radii of angular positions inside the necking structure.

This does not occur at the separation structure in the separation feature (FIG. 3(C)).

Figure 4A:
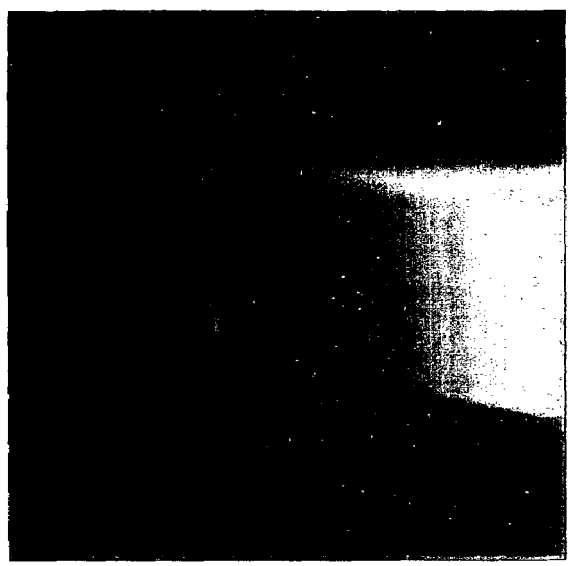
FIG. 4(A) is a 3D image swept from a 2D herniation feature with blue areas representing herniation substances, green areas as normal disc substances and transparent planes as transverse sections passing through the herniation.
Figure 4B:
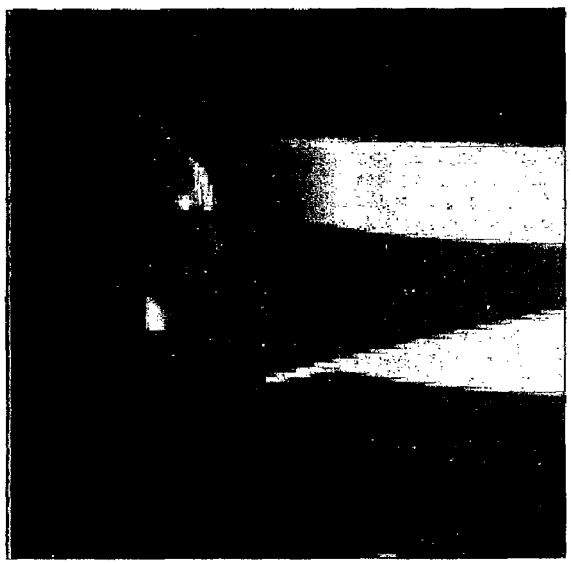
FIG. 4(B) is another 3D image inferred from the 2D features on transverse sections with colors representing the same meanings in FIG. 4(A), showing the most severe classification of 2D features representing the classification of the 3D herniation.

Next, 3D herniation geometry is inferred from 2D features on transverse sections. In the case of one transverse section resolving a disc space, it is usually set as passing through the most herniated location. Therefore, the 3D herniation shape of the bulging or protrusion classification is assumed as parabolically sweeping (with the 2D herniation feature on the section) along with the direction of gravity (as shown in FIG. 4(A)). However, in the extrusion or separation classification, the sweeping becomes linear (as shown in FIG. 4(B)) because the herniated substances are still restrained by the annular ligaments in the classifications of bulging and protrusion, while they are not restrained in the classifications of extrusion and separation. The assumed 3D herniation geometry provides information about the herniation position and volume that should be dissected during microdisectomy and traditional disectomy.

In case of multiple transverse sections resolving the same disc space, the HIVD classification of herniation is first determined. If the 2D features obtained from all sections indicate the same classification then the HIVD is the one. If the features of the respective sections are classified as different, the most serious herniation feature is used to classify the HIVD. That means if the 2D feature in one section is classified as separation, the HIVD is classified as a separation even if other 2D features on the other sections are just classified as bulging or protrusion or extrusion. Similarly, if a 2D feature in one section is classified as an extrusion, the HIVD is an extrusion even it is just classified as a bulging or protrusion in other sections. Finally, if a 2D feature in one section is classified as a protrusion, the HIVD is a protrusion even it is just classified as a bulging in other sections. The reason for using the most serious herniation to classify is that other sections may not pass through the highest herniation and thus cannot indicate the accurate classification. As shown in the separation classification in FIG. 4(B), the inferior section passes through the separated feature of the disc substances so that it resolves a 2D feature of separation and represents the correct classification. In the meanwhile, the superior section passes through the location of ligament breakage so that it only resolves a 2D feature of extrusion or protrusion.

Figure 4C:
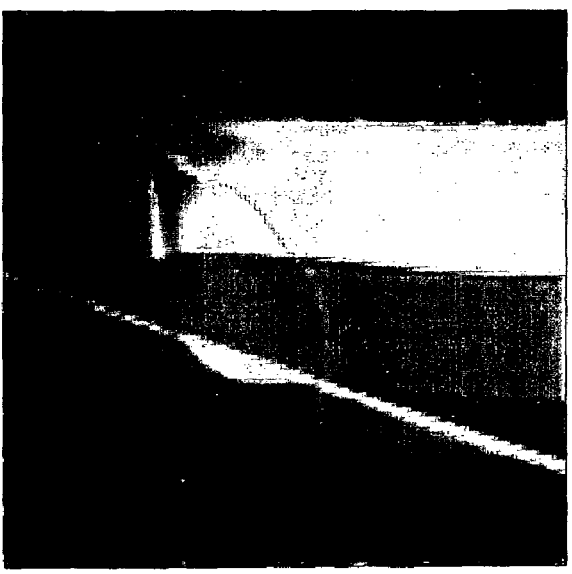
FIG. 4(C) is also a 3D image inferred from the 2D features on transverse sections with colors representing the same meanings in FIG. 4(A), showing oblique 3D herniation because of different angular positions of 2D herniation features.
Figure 4D:
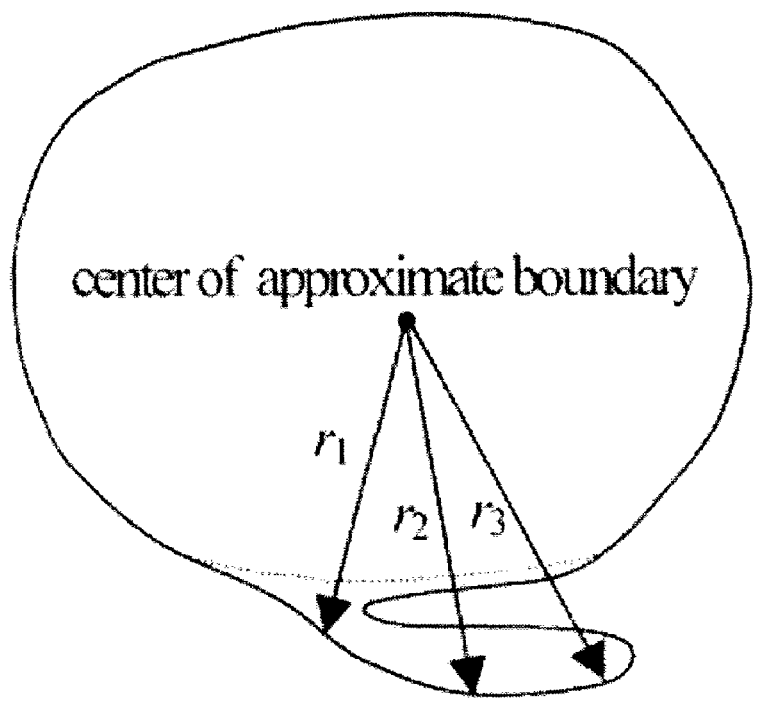
FIG. 4(D) is an explanatory view of 2D herniation features on the superior section in FIG. 4(B) for interpolating in-between features, wherein $r_1$, $r_2$ and $r_3$ are herniation radii for interpolation, and for simplicity, only the largest herniation radius is illustrated at every angular position.
Figure 4E:
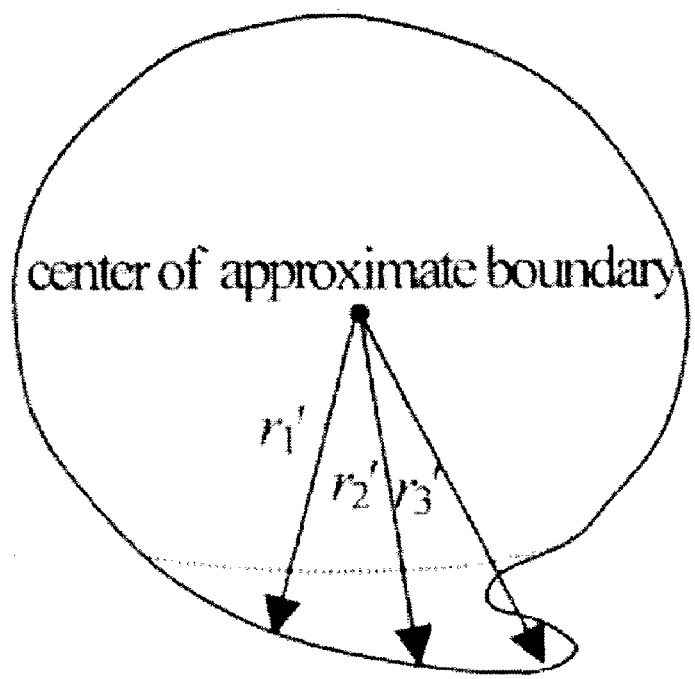
FIG. 4(E) is another explanatory view of 2D herniation features on the inferior section in FIG. 4(B) for interpolating in-between features, wherein $r_1$, $r_2$ and $r_3$ are herniation radii for interpolation, and for simplicity, only the largest herniation radius is illustrated at every angular position.
Figure 12:
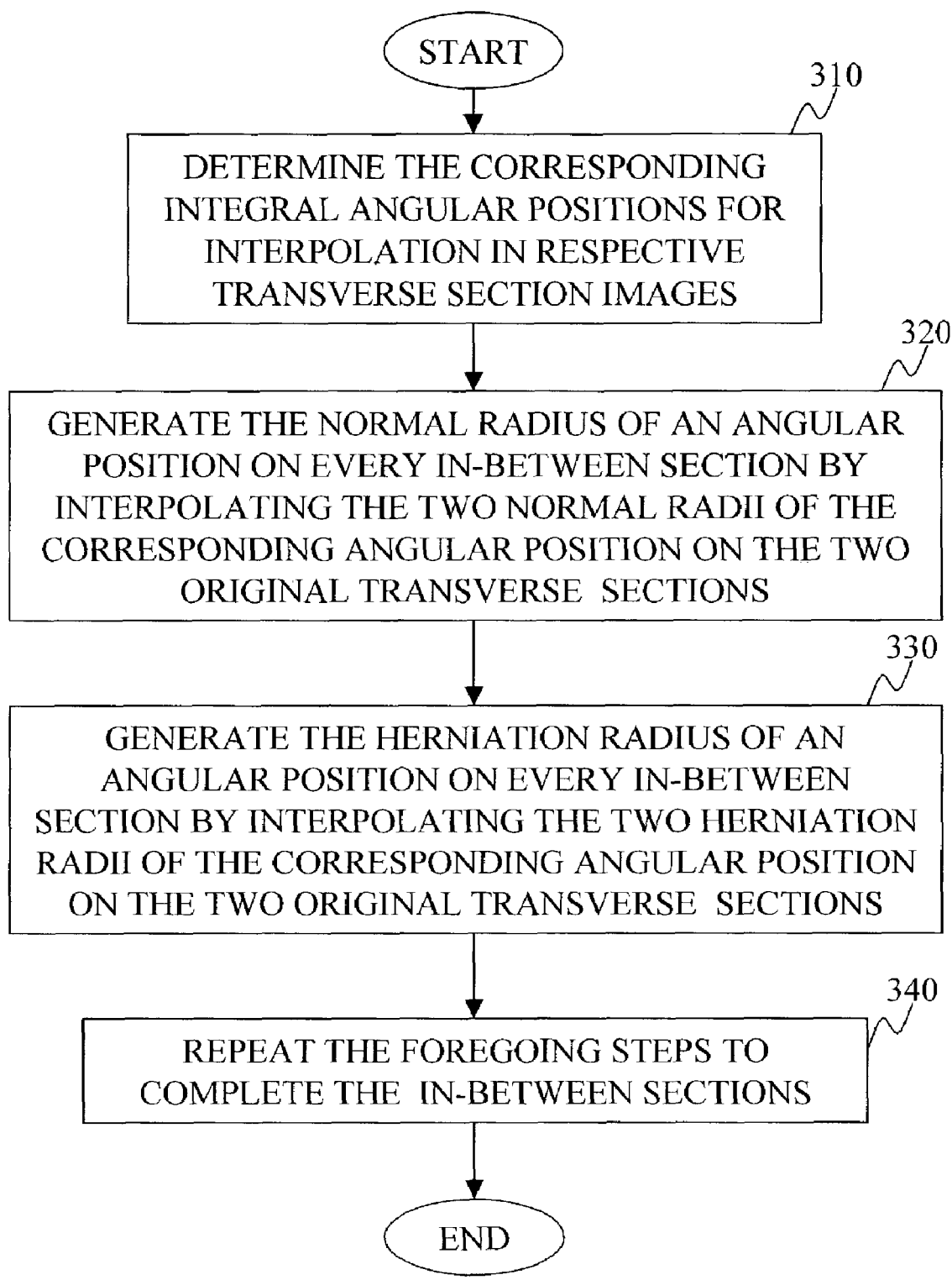
FIG. 12 is a flowchart of 3D image reconstruction inferred from the 2D herniation features according to the invention.

We reconstruct the 3D herniation shape between any two sections by interpolating the two 2D herniation features to generate the in-between 2D features. The procedures are shown in FIGS. 4 and 12, and described as follows:

1. Determine the corresponding integral angular positions for interpolation in respective transverse section (step 310). Because the 3D herniation may be oblique as shown in FIG. 4(C), interpolation cannot be implemented by the same angular position in respective sections and must be implemented by corresponding angular positions (e.g. beginning angular position to angular position, and end to end). However, the two (original) herniation features for interpolating may have different angular ranges. Therefore, the same number of uniform-spacing angles is used to divide the range of each original feature to determine the corresponding angular positions on the two features.

2. Generate the normal radius of an angular position on every in-between section by linearly interpolating the two normal radii of the corresponding angular position on the two original transverse sections (step 320).

3. Generate the herniation radius of the angular position on every in-between section by linearly interpolating the two herniation radii of the corresponding angular position on the two original transverse sections (step 330). For example, $r_1$ and $r_1'$ in FIGS. 4(D) and (E) are used to generate herniation radii of in-between features. However, if multiple (three) herniation radii exist in both the original features ($r_3$ and $r_3'$ in FIGS. 4(D) and (E)), multiple (three) interpolated radii are interpolated sequentially. That means the two smallest radii on the original features interpolate a small radius, the middle radii interpolate a middle radius and the largest radii interpolate a large one. If one feature has one herniation radius ($r_2'$ in FIG. 4(E)) and the other has three radii at the corresponding angular position ($r_2$ in FIG. 4(D)), the three radii on the feature all interpolate with the same radius on the other feature. Then three different radii are generated on every in-between feature.

4. Repeat the foregoing two steps to complete the in-between sections (step 340). Generate all normal radii and herniation radii iteratively on every in-between feature for all angular positions inside the ranges of the original features by the above two steps. The normal and herniation radii determine the in-between features that can be observed one by one or be used together with the two original features to reconstruct the 3D herniation feature by any available volume visualization software.

Clinical applications have proven the higher HIVD diagnosis rate of the image analysis method of the invention. More than 100 patients with lumbar HIVD treated at the Orthopedic Department of Taipei Medical University Hospital from July 1999 to December 2000. We selected 16 (10 men and six women) typical cases including classifications of bulging, protrusion, extrusion and separation to demonstrate the implementation of our method. Informed consent was obtained from patient prior to participation. Some cases were examined by a CT (General Electric high speed CT/i); the other cases were examined with a 0.5 T MR imaging machine (General Electric, Milwaukee, Wis., USA). All 16 patients were first diagnosed by our method for HIVD diagnoses. After failure of conservative management including physiotherapy and medicinal therapy for eight weeks, surgical plans were made based on the above diagnostic information obtained from our method. The surgery modality selected was microdisectomy for the cases classified as bulging, and traditional disectomy for the other classifications. The diagnoses also provided information needed for planning surgical procedures that were simulated by surgeons with new simulators. These simulators can allow surgeons to use various surgical instruments to cut virtual anatomic structures and simulate every procedure of various complex orthopedic surgeries. Thus, the procedures of cutting bones, and dissecting and removing disc substances under laminectomy and disectomy were rehearsed before real operations.

The final diagnoses were confirmed by operative findings (disc classification, shape and position) and were consistent with the diagnoses obtained by the method according to the invention. All 16 patients had clinically satisfactory outcomes after a mean follow-up period of 1.8 years (range, 2 year, 4 month, and 1 year, 3 month). Patients 1, 2, 4, 5, 7, 8, 9, 10, 12, 13, and 14 had excellent results and patients 3, 6, 11, and 15 had good results. That means 12 (75%) outcomes were excellent, four (25%) were good and no fair and poor (no improvement) outcomes. The results of the individual steps of diagnosis and evaluation are listed in Table 1.

Four patients (Cases 1, 2, 3 and 4 in Table 1) are chosen as preferred embodiments. Each of them had an HIVD with classification of bulging, protrusion, extrusion and separation. The image-analysis process for the four cases are all demonstrated. However, the surgical simulation is only shown in Case 2 (Embodiment 2), and the 3D herniation reconstruction only shown in Case 3 (Embodiment 3).

The preliminary diagnosis based on these clinical findings was left lumbar HIVD at L4-5 (the $4^{th}$-$5^{th}$ lumbar vertebra) and right HIVD at L5-S1 (the 1st sacrum vertebra).

Figure 5A:
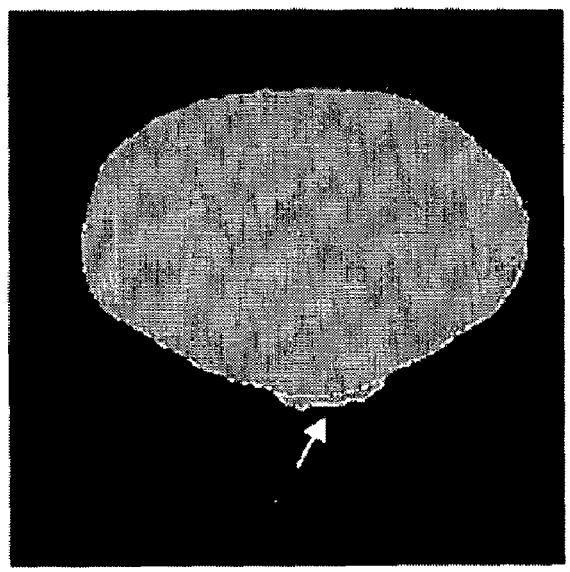
FIG. 5(A) is a CT (computed tomography) transverse section for L4-5 in Embodiment 1 of a bulging HIVD, wherein white points on the boundary have larger approximate errors than other points.
Figure 5B:
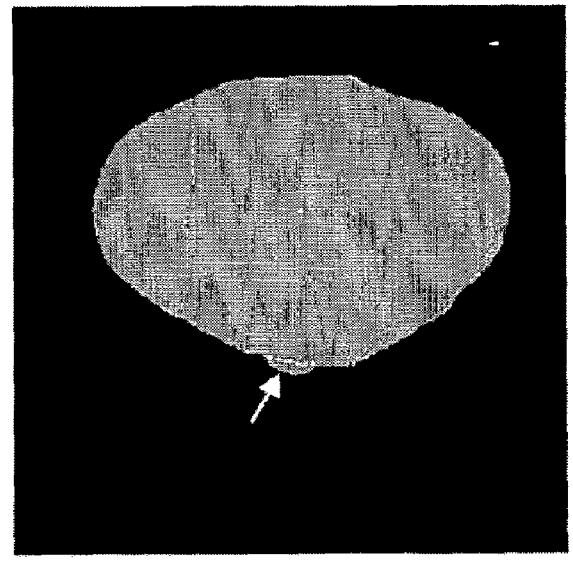
FIG. 5(B) is a superior transverse section of analyzed CT for L5-S1 in Embodiment 1 of a bulging HIVD.
Figure 5C:
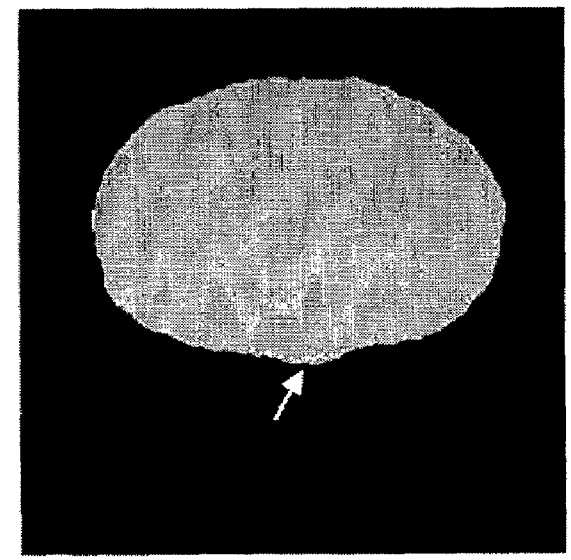
FIG. 5(C) is an inferior transverse section of analyzed CT for L5-S1 in Embodiment 1 of a bulging HIVD.

One transverse section passing the disc space of L4-5 and two for L5-S1 were obtained and then segmented as disc-substance boundaries as illustrated in FIG. 5. In FIGS. 5(A) to (C), black lines are boundaries of the disc substance, white points are the centers of disc boundaries, white lines are interpolated boundaries (approximate normal boundaries of the disc substances) for the herniation features, and solid arrows are herniation features. The boundary interpolated by the B-spline curve and the convex feature at the angular positions between the two spinal roots is demonstrated in each section. The errors between the approximate boundary and the original boundary are nearly zero at the integral angular positions (except at the feature) and have rather large values at the midpoint between any two-integer positions. In FIG. 5(A), white points on the boundary represent the boundary points with large errors but all had values

TABLE 1

Clinical characteristics, diagnosis by our methods (IATS), accuracy of diagnosis rate based on comparison with operative findings, operative methods, and outcomes of patients (IATS, image analysis of transverse sections; L-HIVD, lumbar herniated inter-vertebral disc; BD, bulging disc; PD, protruding disc; ED, extruding disc; SD, separation disc; Lat, lateral; Cen, central; L, lumbar; MD, microdisectomy; PL, partial lamiectomy; TL, total lamiectomy; D, disectomy; M, male; F, female; E, excellent; G, good)

| Case No. | Age (yr) | Sex | Diagnosis by our method | Operation method | Accuracy of diagnosis by operative findings | Follow up post-operation | Clinical results |
|---|---|---|---|---|---|---|---|
| 1* | 41 | M | L-HIVD L4-5, lat. BD | MD | Confirmed | 2Y4M | E |
|    |    |   | L-HIVD L5-S1, cen. BD | MD | Confirmed | 2Y4M | E |
| 2* | 32 | M | L-HIVD L3-4, cen. PD | PL + D | Confirmed | 1Y6M | E |
|    |    |   | L-HIVD L4-5, cen. PD | PL + D | Confirmed | 1Y6M | E |
| 3 | 51 | F | L-HIVD L5-S1, cen. ED | TL + D | Confirmed | 2Y2M | G |
| 4 | 27 | M | L-HIVD L3-4, lat. SD | TL + D | Confirmed | 1Y2M | E |
| 5 | 26 | M | L-HIVD L4-5, lat. SD | TL + D | Confirmed | 1Y3M | E |
| 6 | 50 | M | L-HIVD L5-S1, cen. ED | TL + D | Confirmed | 2Y1M | G |
| 7 | 31 | F | L-HIVD L5-S1, cen. BD | MD | Confirmed | 2Y2M | E |
| 8 | 40 | M | L-HIVD L4-5, lat. BD | PL + D | Confirmed | 2Y | E |
| 9 | 43 | F | L-HIVD L4-5, lat. BD | MD | Confirmed | 1Y10M | E |
| 10 | 34 | F | L-HIVD L3-4, lat. BD | PL + D | Confirmed | 1Y11M | E |
| 11 | 53 | M | L-HIVD L5-S1, cen. ED | TL + D | Confirmed | 2Y | G |
| 12 | 29 | M | L-HIVD L5-S1, cen. SD | TL + D | Confirmed | 1Y8M | E |
| 13 | 30 | F | L-HIVD L4-5, lat. SD | TL + D | Confirmed | 1Y6M | E |
| 14 | 54 | F | L-HIVD L4-5, lat. ED | TL + D | Confirmed | 1Y10M | E |
| 15 | 35 | M | L-HIVD L5-S1, cen. BD | MD | Confirmed | 2Y1M | G |
| 16 | 45 | M | L-HIVD L4-5, lat. BD | MD | Confirmed | 1Y7M | E |

*Cases 1 and 2 bad two levels of disc herniation.

A. Embodiment 1(Case 1): bulging HIVD

The first embodiment (Case 1) was a 41-year-old man who had suffered from left sciatica off and on without lower back pain for 6 months. The following abnormalities were noted during physical examination.

a. Mild atrophy of the left thigh muscle;

b. Weakness dorsiflexion on the left big toe test (+), and right plantar flexion on right big toe test (+);

c. Laseque's sign (positive finding with 40° elevation of the left leg and 50° elevation of the right leg);

d. Absence of knee jerk;

e. Hypoesthesia (sensory loss) of the L5 dermatome; and f. Positive findings on lateral bending of the left leg.

under 0.8% of their radii indicating that the B-spine approximation caused little error. The distance between the centers of the disc-substances and the B-spline boundary is 5% comparing the radius to the boundary. This reveals that the feature effects the center position very little.

Because there were no necking or separation structures in the three boundaries and the largest ratios in all sections were not sufficiently large to be classified as protrusions, the herniation was bulging both in L4-5 and L5-S1. The herniation in L4-5 (FIG. 5(A)) was left lateral. The herniation in the L5-S1 was central in the superior section (FIG. 5(B)), but was left lateral in the inferior section (FIG. 5(C)). Therefore, the herniation at L5-S1 was oblique along the central to right lateral regions. At each section, the angular range of the herniation feature and the herniation radius of every angular position inside the feature were calculated. These data were given to the surgeons for use in preparation for the microdiscectomy.

B. Embodiment 2(Case 2): protrusion HIVD

The second patient was a 32-year-old man who had suffered from right sciatica with low back pain for 1.5 years following a sudden attack in the lumbar region after exercise. The following abnormalities were noted during physical examination:
 a. Atrophy of the right thigh muscle;
 b. Weak dorsiflexion on the right big toe test (+);
 c. Laseque's sign (positive finding with 408 elevation of the left leg);
 d. Absence of knee jerk; sensory loss of L3, L4 and L5 dermatome; and
 e. Positive findings on lateral bending of the left leg.

These findings were suggestive of lumbar HIVD to the right at L3-4 and (or) L4-5. However, herein, we only describe the analytical results and surgery-simulation results for L3-4.

Figure 6A:
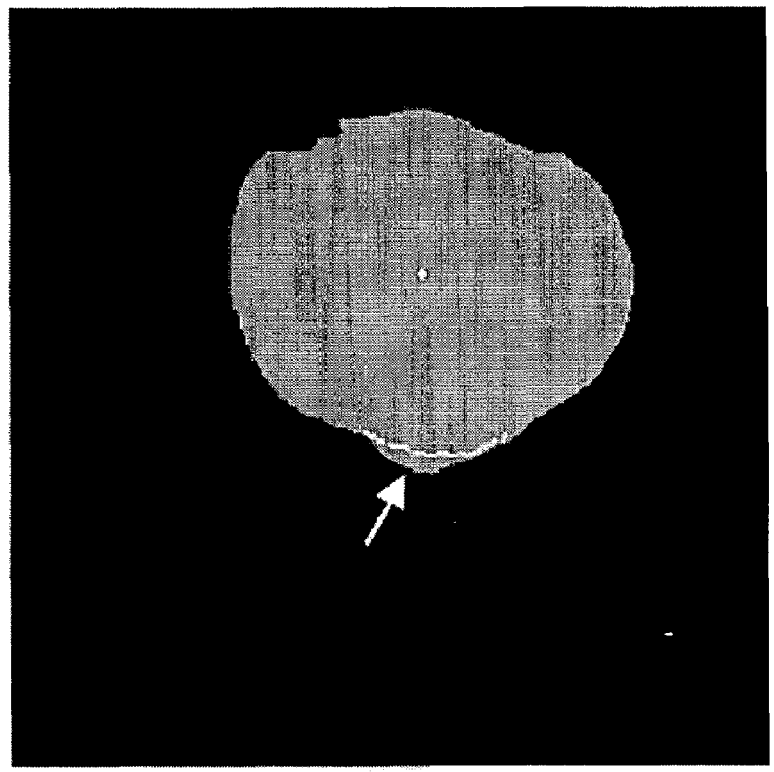
FIG. 6(A) is a superior transverse section of analyzed CT for L3-4 in Embodiment 2 of a protrusion HIVD.
Figure 6B:
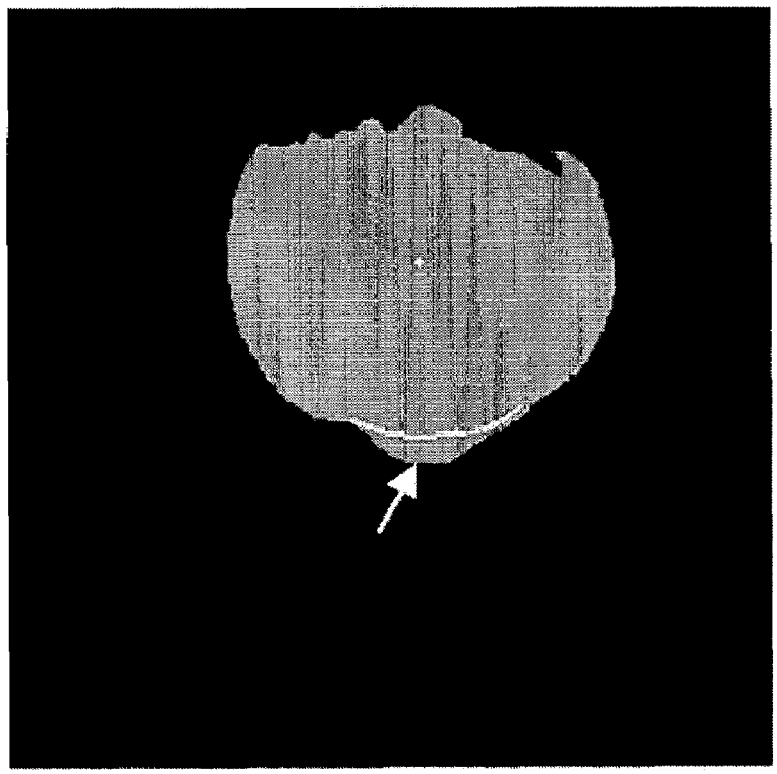
FIG. 6(B) is an inferior transverse section of analyzed CT for L3-4 in Embodiment 2 of a protrusion HIVD.
Figure 7A:
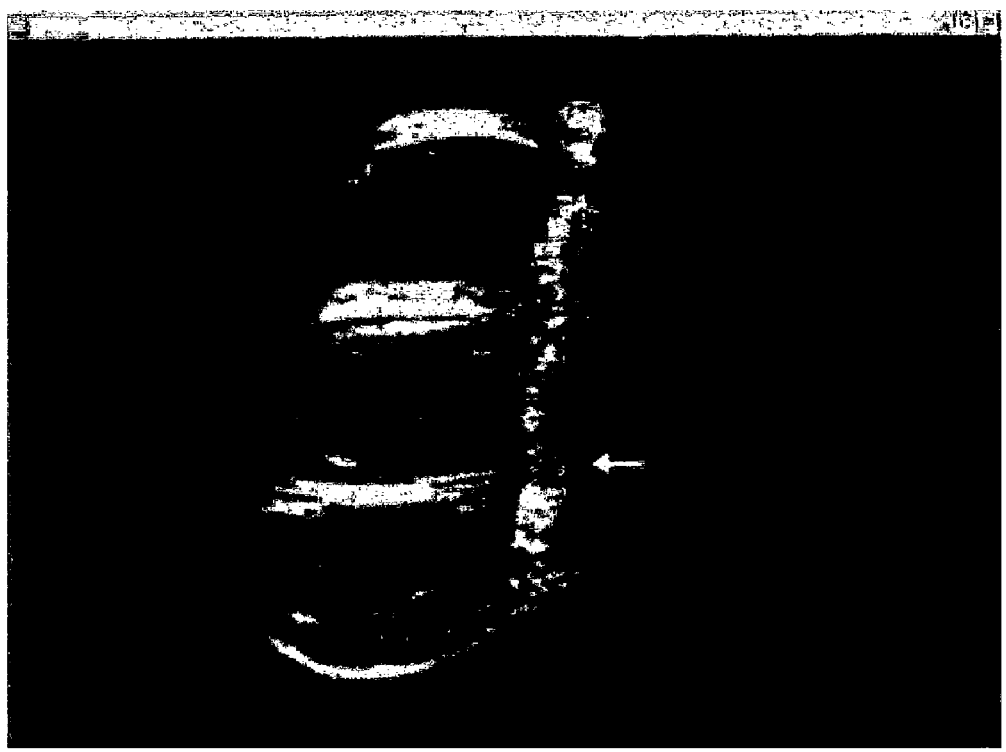
FIG. 7(A) is a 3D image without bones before decompression on L3-4 in Embodiment 2, in which a solid arrow indicates the central disk with extruded L3-4 nerve root compression.
Figure 7B:
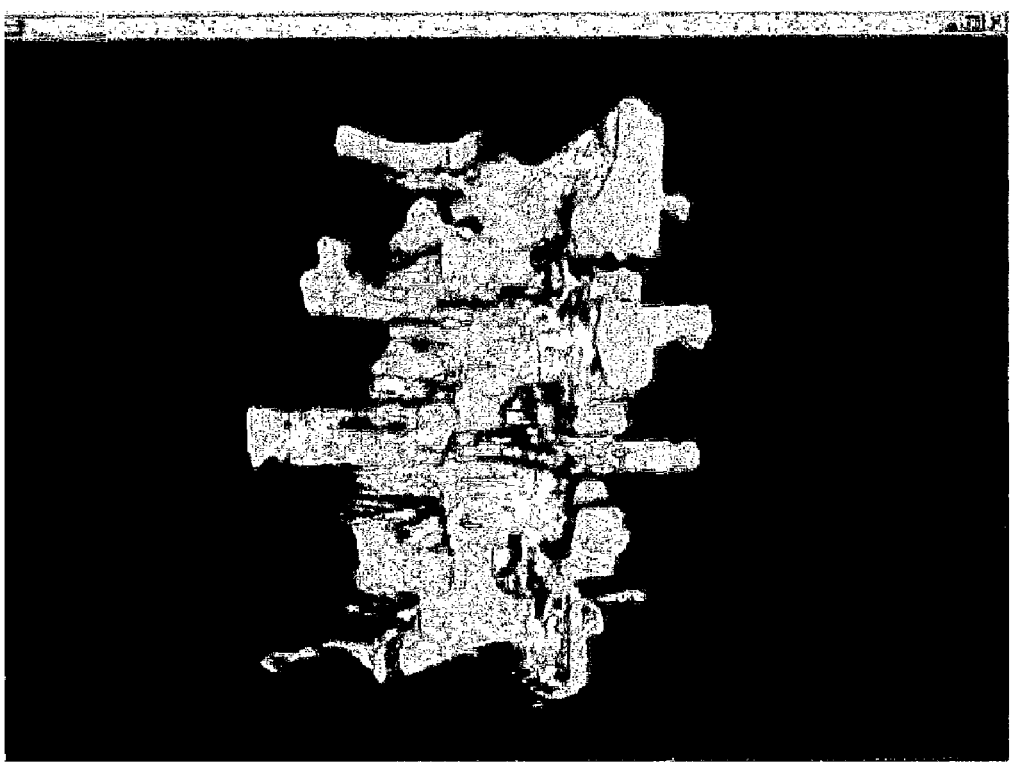
FIG. 7(B) is a complete 3D image before decompression on L3-4 in Embodiment 2.
Figure 7C:
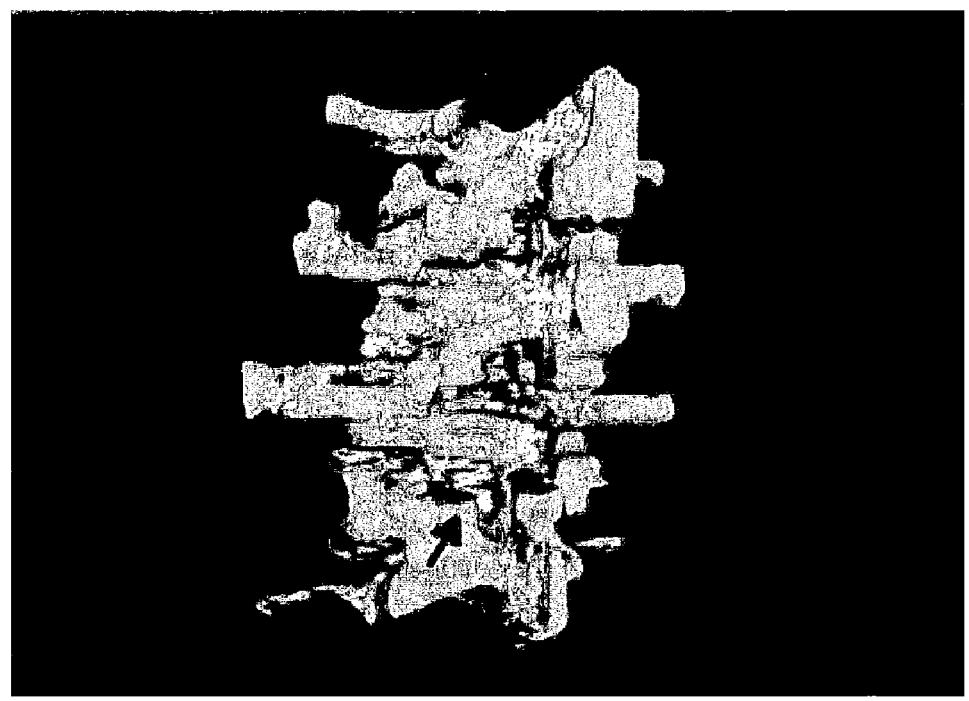
FIG. 7(C) is a complete 3D image during decompression on L3-4 in Embodiment 2, in which a solid arrow indicates an after laminectomy area.
Figure 7D:
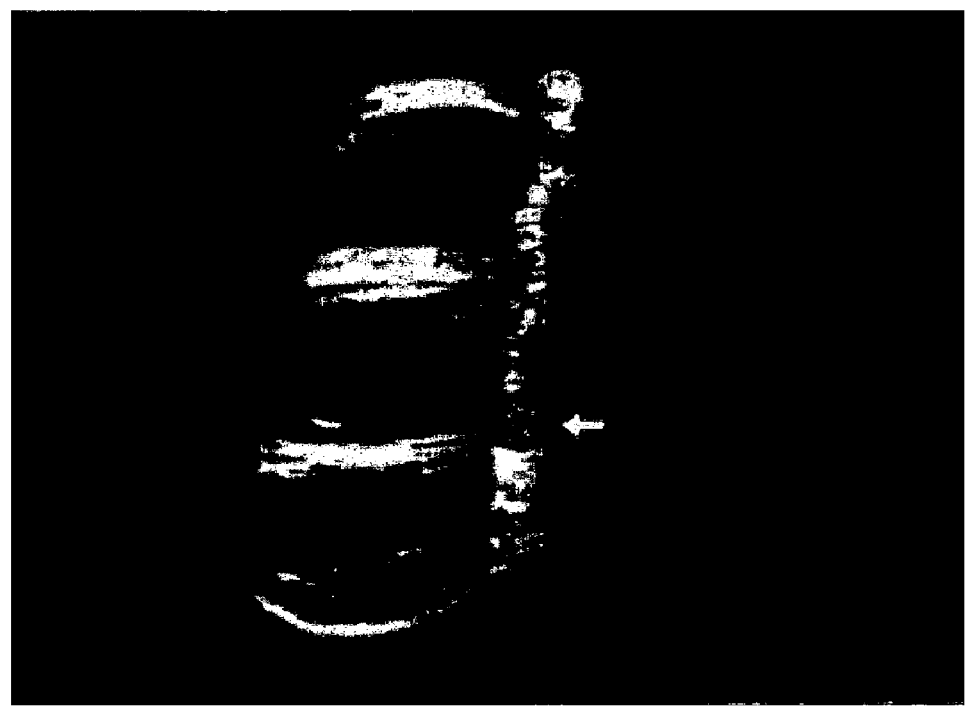
FIG. 7(D) is a 3D image without bones after decompression of L3-4 in Embodiment 2, in which a solid arrow indicates the central disk with extruded L3-4 nerve root decompression.

CT was performed in 35 transverse sections with 3 m intervals inside each disc space and 6 mm intervals between disc spaces (from L1 to L5). FIGS. 6(A) and (B) show two sections passing 1 mm above and 2 mm below the middle of L3-4; the signs in FIG. 5 represent the same. Because the angular positions of the largest herniation ratios at the two sections were one left and one right lateral, meaning at two sides of the cord, the HIVD is considered central and a little oblique along the gravity direction. In addition, the largest herniation ratio was large enough so that the HIVD was classified as a protrusion.

FIG. 7 shows part of the simulation of the traditional disectomy for dissecting the herniation. In these 3D images, green areas represent disc spaces, gray areas are surfaces of bones, red areas are the spinal cord and roots, and blue lines are axis lines of the volume formed by the transverse sections. To obtain volume data with a constant interval in the transverse sections, one section was generated between any two transverse sections with a 6-mm interval, so that all sections comprising the volume had the same 3-mm interval. FIG. 7(B) and (C) show 3D images of a posterior view of the lumbar spine (from L1 to L5), including bones (gray area), disc spaces (green area) and spinal cord and roots (red area). Because the gray levels for the disc spaces and the spinal cord and roots were too ambiguous for thresholding, bordering for the disc spaces and spinal cord and roots was implemented. FIGS. 7(A) and (D) show vertebral bones after bone disarticulation. The image in FIG. 7(A) reveals the herniation of the disc spaces of L3-4 and L4-5, and the compression on the spinal cord at these two spaces. FIG. 7(C) shows an image from the simulation of the result after opening the lamina for removing some of the disc substances at L3-4. FIG. 7(D) shows the result after the herniation feature at L3-4 was removed. The spinal cord and roots at every section were simulated as moving toward the center with the removed length of the removed herniation feature. The images show the spinal cord and roots returning to their normal locations after the herniation was removed.

C. Embodiment 3(Case 3): extrusion HIVD

The third patient was a 51-year-old woman who had suffered from bilateral sciatica with low back pain for (for example) 20 months after a sudden attack of low back pain in the lumbar area upon heavy lifting. The following abnormalities were noted during physical examination:
 a. Atrophy of the right thigh muscle; weak plantar flexion on right big toe test (+);
 b. Laseque's sign (positive finding with 358 elevation of the both lower legs);
 c. Absence of ankle jerk;
 d. Sensory loss in the S1 dermatome; and
 e. Positive finding of low back pain on lateral bending of the right leg.

These findings were indicative of lumbar HIVD on both sides at L5-S1 with greater severity on the right side.

Two transverse sections for resolving L5-S1 were obtained and segmented as disc-substance boundaries as illustrated in FIGS. 8(A) and (B). In the two analyzed CT transverse sections, black lines are boundaries of the disc substance, and white points are the centers of disc boundaries, while white lines are interpolated boundaries (approximate normal boundaries of the disc substances) for the herniation features, and solid arrows are extrusion features. At the boundary of the superior section, necking was seen at both sides of the herniation (hollow arrows in FIG. 8(A)); therefore, the 2D feature can be classified as an extrusion. At the boundary of the inferior section, although no clear necking was seen on both sides of the herniation (FIG. 8(B)), the 2D feature should be classified as an extrusion. The largest herniation ratio was large enough and the herniation radius changed rapidly at both sides of the herniation to become necking. Thus, this L5-S1 space was classified as a disc extrusion based on the combined information in the two sections. In addition, the two sections both revealed that the HIVD was right lateral. However, because the herniation radii of the angular positions near the cord and the left root were relatively large, total laminectomy was indicated.

FIG. 8(C), shows that the reconstructed 3D herniation feature combined the characteristics of the 2D features on the two sections. Especially, the necking structures (hollow arrows) that appeared in the superior section but not in the inferior section also demonstrate the characteristic of range reduction along the gravity direction.

D. Embodiment 4(Case 4): separation HIVD

This 27-year-old man had suffered from right sciatica with low back pain for 1.5 years after a sudden attack of lumbar pain after heavy lifting. The following abnormalities were noted during physical examination:
 a. Atrophy of the right thigh muscle;
 b. Weakness on dorsiflexion on the right big toe test (+);
 c. Laseque's sign (positive finding with 308 elevation of the right leg);
 d. Absence of knee jerk;
 e. Sensory loss in the L3, L4 and L5 dermatome; and
 f. Positive findings on lateral bending of the right leg.

These findings suggested the presence of right lumbar HIVD at L3-4 and (or) L4-5.

Figure 9A:
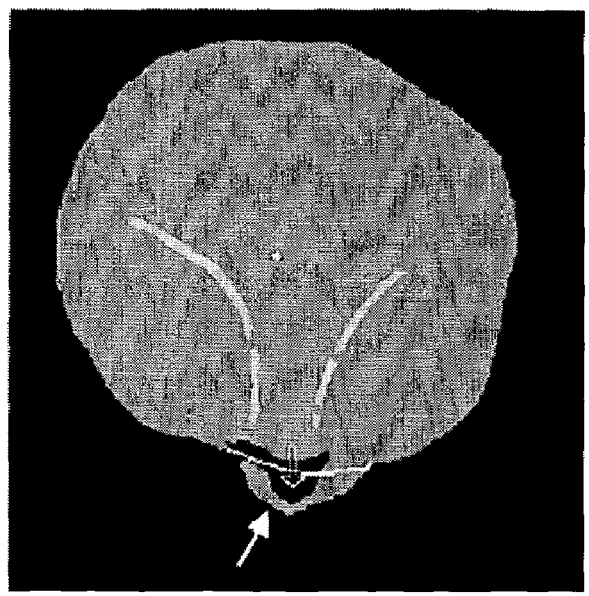
FIG. 9(A) is a superior transverse section of analyzed CT for L3-4 in Embodiment 4 of a separation HIVD.
Figure 9B:
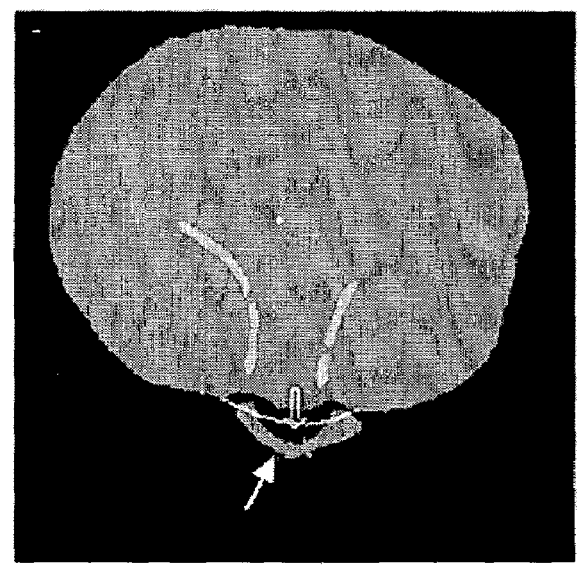
FIG. 9(B) is a middle transverse section of analyzed CT for L3-4 in Embodiment 4 of a separation HIVD.
Figure 9C:
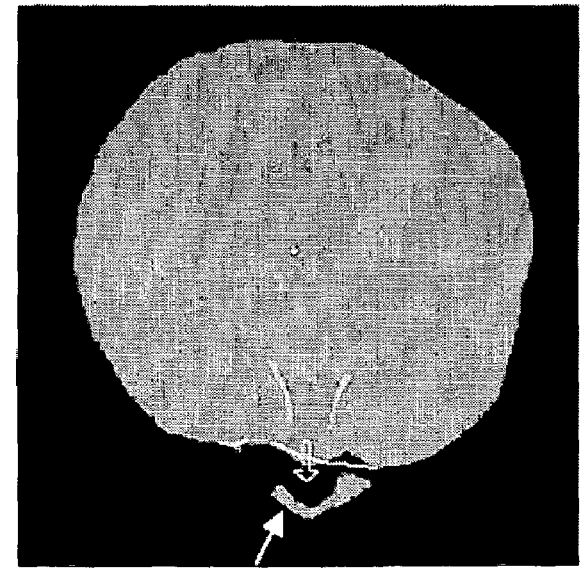
FIG. 9(C) is an inferior transverse section of analyzed CT for L3-4 in Embodiment 4 of a separation HIVD.
Figure 10:
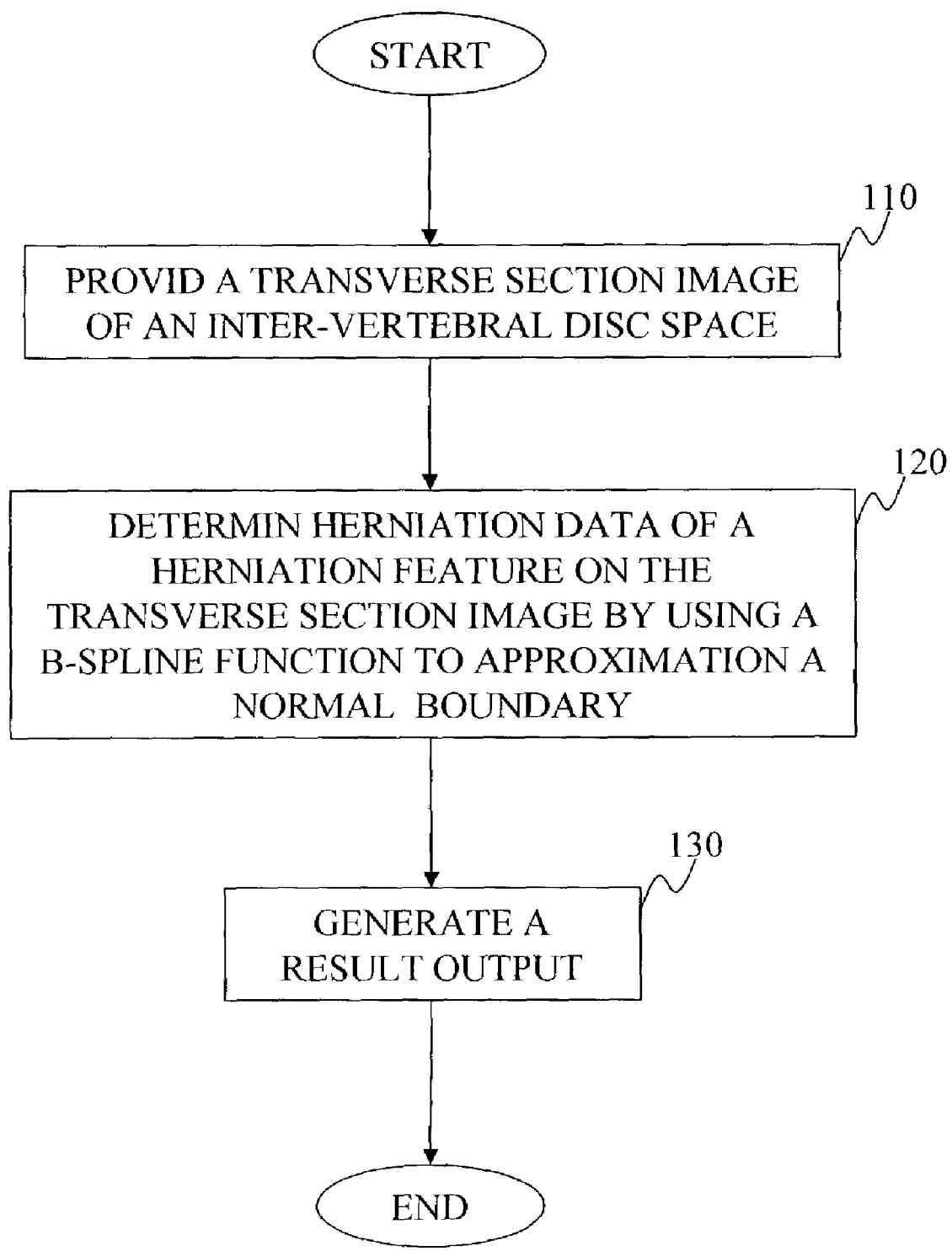
FIG. 10 is a flowchart of the image analysis method according to the invention.

Three transverse sections for resolving L3-4 were obtained and segmented as disc-substance boundaries as illustrated in FIG. 9. In the three analyzed CT transverse sections, black lines are boundaries of the disc substance, and white points are the centers of disc boundaries. Meanwhile, white lines are interpolated boundaries (approximate normal boundaries of the disc substances) for the herniation features, solid arrows are herniation features, and hollow arrows indicate separation features. A necking structure was identified at the boundary of the superior section as shown in FIG. 9(A). This feature does not include a separate structure and the herniation is therefore classified as an extrusion with this section only. However, the middle and inferior sections (FIGS. 9(B) and (C)) formed separation structures, and the herniation at this space was classified as separation. We also observed a large angular range about the central cord that had large herniation ratios in each section, indicating that the herniated disc substances heavily compressed the spinal cord and the roots, and that dissection by total laminectomy was required. Interior boundaries were also observed in all three sections. These boundaries were considered to represent fibrosis of disc substances due to pathological herniation. From the results, we also observed that the inner boundaries did not affect the results for determination of the center, features and B-spline approximation.

In conclusion, the herniation classification and geometry estimation in inter-vertebral disc diagnosis are important factors in deciding the appropriate diagnostic modality and treatment procedures. Currently, HIVD diagnosis using transverse sections is performed mainly based on clinician experience and without the benefit of qualitative and quantitative analyses. In the invention, we propose a method for analyzing the herniation features to classify the herniation and estimate the herniation geometry so that precise surgical procedures for dissection of the herniation can be evaluated. The method uses a B-spline curve to approximate the normal disc boundary, which is assumed to have no herniation, and determines the concave and convex features with rapid radius changes and calculates the herniation ratio by comparing radii of a normal disc boundary and a herniation boundary. The herniation ratio is then used to determine the herniation classification and position, and assist in surgical planning. The radial B-spline approximation can reduce the complex variances on the boundary and achieve good results. Application in 16 patients with lumbar HIVD in the invention demonstrated that the technique allows clinicians to quantitatively evaluate the classification and position of herniated disc substances, and obtain precise spatial herniation information from multiple sections. Combining this technique with surgical simulation may facilitate automated diagnosis, surgical planning and verification, prognosis assessment and management of patients with lumbar HIVD.

Though the embodiments were mostly applied to lumbar HIVD, the method can be also used to analyze all the transverse sections where the disc-substance boundaries are circle-like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image analysis method for herniated inter-vertebral disc (HIVD), comprising steps of:
providing at least a transverse section of an inter-vertebral disc space;
determining herniation data of a herniation feature on the transverse section, wherein the herniation data is determined by the steps of: obtaining an original center by averaging pixel positions of disc substances on the transverse section; determining an outmost original boundary; obtaining two terminal points of the herniation feature on the original boundary; interpolating a plurality of normal radii of all integral angular positions between the two terminal points; determining an approximation boundary by determining a B-spline function; and obtaining an approximation center to redetermine the herniation data; and
using a B-spline function to approximate a normal boundary thereon;
and generating a result output; wherein the transverse section is circle-like.

2. The method according to claim 1, wherein the herniation data comprises normal radii, herniation radii, herniation ratios, corresponding integral angular positions, range of integral angular positions, or classification of the herniation feature.

3. The method according to claim 2, wherein the herniation ratio is the ratio of the herniation radius to the normal radius.

4. The method according to claim 1, wherein the original boundary is composed of a plurality of intersection points of the original boundary and a plurality of vectors starting from the disc substance center along every integral angular position.

5. The method according to claim 1, wherein at least a concave feature is further excluded to determine the approximation boundary.

6. The method according to claim 1, wherein the original boundary further determines a plurality of original radii from the original center.

7. The method according to claim 6, wherein the normal radii are interpolated by using the two original radii of the two terminal points of the herniation feature.

8. The method according to claim 1, wherein the transverse section is provided by computed tomography (CT) or magnetic resonance imaging (MRI).

9. The method according to claim 1, wherein the result output is an information list with the herniation data thereof.

10. The method according to claim 1, wherein the result output is a plurality of indicating points showing the approximation boundary on the transverse section.

11. The method according to claim 1, wherein the result output is an indicating sign pointing the position of the herniation feature.

12. The method according to claim 1, wherein the result output is a 3-dimensional image inferred from two of the herniation features on different two of the transverse sections, which pass through the same inter-vertebral disc space.

13. The method according to claim 12, wherein the 3-dimensional image is reconstructed by the steps of:
determining the corresponding integral angular positions for interpolation on each of the two transverse sections;
generating the normal radii of the angular position on a plurality of in-between sections, by interpolating the two corresponding normal radii on the two original transverse sections;
generating the herniation radii of the angular position on a plurality of in-between sections, by interpolating the two corresponding herniation radii on the two original transverse sections; and
repeating the foregoing two steps to complete the in-between sections.

14. The method according to claim 13, wherein the result output further comprises a plurality of 2-dimensional images of the in-between sections.

15. The methods according to claim 13, wherein the herniation radii of the in-between sections are generated before the normal radii.

* * * * *